US012734699B2

(12) United States Patent
Xu et al.

(10) Patent No.: US 12,734,699 B2
(45) Date of Patent: Sep. 15, 2026

(54) RELIABLE ROBOTIC MANIPULATION IN A CLUTTERED ENVIRONMENT

(71) Applicant: eBots Inc., Fremont, CA (US)

(72) Inventors: Zheng Xu, Pleasanton, CA (US); John W. Wallerius, Sunnyvale, CA (US); Adit A. Desai, Santa Clara, CA (US)

(73) Assignee: EBOTS INC., Fremont, CA (US)

( * ) Notice: Subject to any disclaimer, the term of this patent is extended or adjusted under 35 U.S.C. 154(b) by 351 days.

(21) Appl. No.: 18/129,537

(22) Filed: Mar. 31, 2023

(65) Prior Publication Data

US 2023/0339118 A1 Oct. 26, 2023

Related U.S. Application Data

(60) Provisional application No. 63/332,922, filed on Apr. 20, 2022.

(51) Int. Cl.

| | |
|---|---|
| ***B25J 9/16*** | (2006.01) |
| ***G06T 7/10*** | (2017.01) |
| ***G06T 7/70*** | (2017.01) |

(52) U.S. Cl.

CPC ............ *B25J 9/1697* (2013.01); *B25J 9/163* (2013.01); *B25J 9/1664* (2013.01); *G06T 7/10* (2017.01); *G06T 7/70* (2017.01); *G06T 2207/10024* (2013.01); *G06T 2207/10028* (2013.01); *G06T 2207/10152* (2013.01);

(Continued)

(58) Field of Classification Search

CPC . G06T 2207/10024; G06T 2207/10028; G06T 2207/10152; G06T 2207/20021; G06T 2207/20081; G06T 2207/20084; G06T 7/10; G06T 7/70; G06T 2207/10064; G06T 5/60; B25J 9/1697; B25J 9/163; B25J 9/1664; B25J 19/023; B25J 19/021; G01B 11/2513; G06V 10/141; G06V 10/60; G05B 2219/39045; G05B 2219/40196

See application file for complete search history.

(56) References Cited

U.S. PATENT DOCUMENTS

| | | | | |
|---|---|---|---|---|
| 8,125,562 | B2 * | 2/2012 | Shaw | H04N 23/56 348/370 |
| 2017/0132824 | A1 * | 5/2017 | Otsuka | H04N 23/843 |

(Continued)

*Primary Examiner* — Khoi H Tran
*Assistant Examiner* — Alyse Tramanh Tran
(74) *Attorney, Agent, or Firm* — Shun Yao; Yao Legal Services, Inc.

(57) ABSTRACT

One embodiment can provide a robotic system. The robotic system can include a robotic arm comprising an end-effector, an illumination unit comprising a plurality of single-color light sources of different colors, a structured-light projector to project codified light patterns onto a scene, one or more cameras to capture pseudo-color images of the scene illuminated by the single-color light sources of different colors and images of the scene with the projected codified light patterns, a pose-determination unit to determine a pose of a component based on the pseudo-color images and the images of the scene with the projected codified light patterns, a path-planning unit to generate a motion plan for the end-effector based on the determined pose of the component and a current pose of the end-effector, and a robotic controller to control movement of the end-effector according to the motion plan to allow the end-effector to grasp the component.

18 Claims, 5 Drawing Sheets

(52) U.S. Cl.
CPC ............... *G06T 2207/20021* (2013.01); *G06T 2207/20081* (2013.01); *G06T 2207/20084* (2013.01)

(56) References Cited

U.S. PATENT DOCUMENTS

2022/0405506 A1* 12/2022 Taamazyan .......... B25J 15/0608
2023/0298189 A1* 9/2023 Song ......................... G06T 7/80 382/154

* cited by examiner

RELIABLE ROBOTIC MANIPULATION IN A CLUTTERED ENVIRONMENT

RELATED APPLICATIONS

This claims the benefit of U.S. Provisional Patent Application No. 63/332,922, entitled "RELIABLE ROBOTIC MANIPULATION IN A CLUTTERED ENVIRONMENT," by inventors Zheng Xu, John W. Wallerius, and Adit A. Desai, filed 20 Apr. 2022, the disclosure of which is incorporated herein by reference in its entirety for all purposes.

BACKGROUND

Field

This disclosure is generally related to the control of a robotic system. Particularly, this disclosure is related to controlling a robotic system based on machine-learning models and 3D computer visioning.

RELATED ART

Advanced robotic technologies have dramatically changed the way products are produced and led to the fourth industrial revolution (also referred to as Industry 4.0). The fourth industrial revolution improves the computing and automation technologies developed during the third industrial revolution by allowing computers and robotics to connect and communicate with one another to ultimately make decisions without human involvement. A combination of the cyber-physical systems, the Internet of Things (IoT), and the Internet of Systems (IoS) makes Industry 4.0 possible and the smart factory a reality. Smart machines (e.g., robots) can get smarter as they gain access to more data and learn new skills, which can lead to more efficient and productive and less wasteful factories. Ultimately, a network of digitally connected smart machines that can create and share information will result in true "lights-out manufacturing" where no human supervision is needed.

Artificial Intelligence (AI) has been playing an important role in enabling robots to perform complex tasks autonomously, learn from experience, and adapt to changing environments. In the past decade, various machine-learning approaches have been developed to control the operations of the robots, such as the supervised-learning approach, the unsupervised-learning approach, and the reinforcement-learning approach. Although the current machine-learning approaches for robotic control have shown great versatility, adaptivity, and dexterity, they often cannot meet the precision requirement of the manufacturing of consumer electronics which can require the robots to recognize, in a cluttered environment, components (some are tiny) of different shapes and sizes, grasp the components without dropping or damaging them, and manipulating the components as needed by the manufacturing task. The success rate of robotic manipulation based on existing machine-learning models can be in the range between 90% and 97%. However, a typical assembly line requires a success rate of 99.9995% and beyond.

SUMMARY

One embodiment can provide a robotic system. The robotic system can include a robotic arm comprising an end-effector, an illumination unit comprising a plurality of single-color light sources of different colors, a structured-light projector to project codified light patterns onto a scene, one or more cameras to capture pseudo-color images of the scene illuminated by the single-color light sources of different colors and images of the scene with the projected codified light patterns, a pose-determination unit to determine a pose of a component of interest based on the pseudo-color images of the scene and the images of the scene with the projected codified light patterns, a path-planning unit to generate a motion plan for the end-effector based on the determined pose of the component and a current pose of the end-effector, and a robotic controller to control movement of the end-effector according to the motion plan to allow the end-effector to grasp the component of interest.

In a variation on this embodiment, the robotic system can further include an error-compensation unit to compensate for errors in the movement of the end-effector.

In a further variation, the error-compensation unit is to apply a machine-learning technique to determine a controller-desired pose corresponding to a camera-instructed pose of the end-effector such that, when the robotic controller controls the movement of the end-effector based on the controller-desired pose, the end-effector achieves, as observed by the cameras, the camera-instructed pose.

In a variation on this embodiment, the single-color light sources of different colors can be turned on alternately, one color at a time.

In a variation on this embodiment, the single-color light sources can include light-emitting diodes (LEDs), and colors of the single-color light sources can range between ultraviolet and infrared.

In a variation on this embodiment, the robotic system can further include an image-segmentation unit to generate a segmentation mask for an image of the scene based on the pseudo-color images.

In a further variation, the robotic system can further include a point-cloud-generation unit to generate a three-dimensional (3D) point cloud of the component of interest by overlaying the segmentation mask on the images of the scene with the projected codified light patterns.

In a further variation, the pose-determination unit can determine the pose of the component of interest based on the 3D point cloud and a geometric model of the component.

In a further variation, the image-segmentation unit can generate the segmentation mask by implementing a machine-learning model comprising a Mask Region-based Convolutional Neural Network (Mask R-CNN).

In a variation on this embodiment, the codified light patterns can be encoded based on maximum min-SW gray codes.

One embodiment can provide a computer-implemented method for controlling a robotic arm. During operation, a robotic controller can generate an initial set of instructions to control the robotic arm to move an end-effector towards a component of interest in a work scene. In response to determining that the end-effector is within a vicinity of the component of interest, the controller can configure a plurality of single-color light sources of different colors to illuminate the work scene, configure a structured-light projector to project codified light patterns onto the work scene, and configure one or more cameras to capture pseudo-color images of the work scene illuminated by the single-color light sources of different colors and images of the work scene with the projected codified light patterns. The controller can determine a pose of the component of interest based on the pseudo-color images of the work scene and the images of the work scene with the projected codified light patterns, generate a set of refined instructions based on the determined pose of the component and a current pose of the end-effector, and control movement of the end-effector according to the set of refined instructions to allow the end-effector to grasp the component of interest.

BRIEF DESCRIPTION OF THE FIGURES

In the figures, like reference numerals refer to the same FIG. elements.

DETAILED DESCRIPTION

Overview

Figure 1:
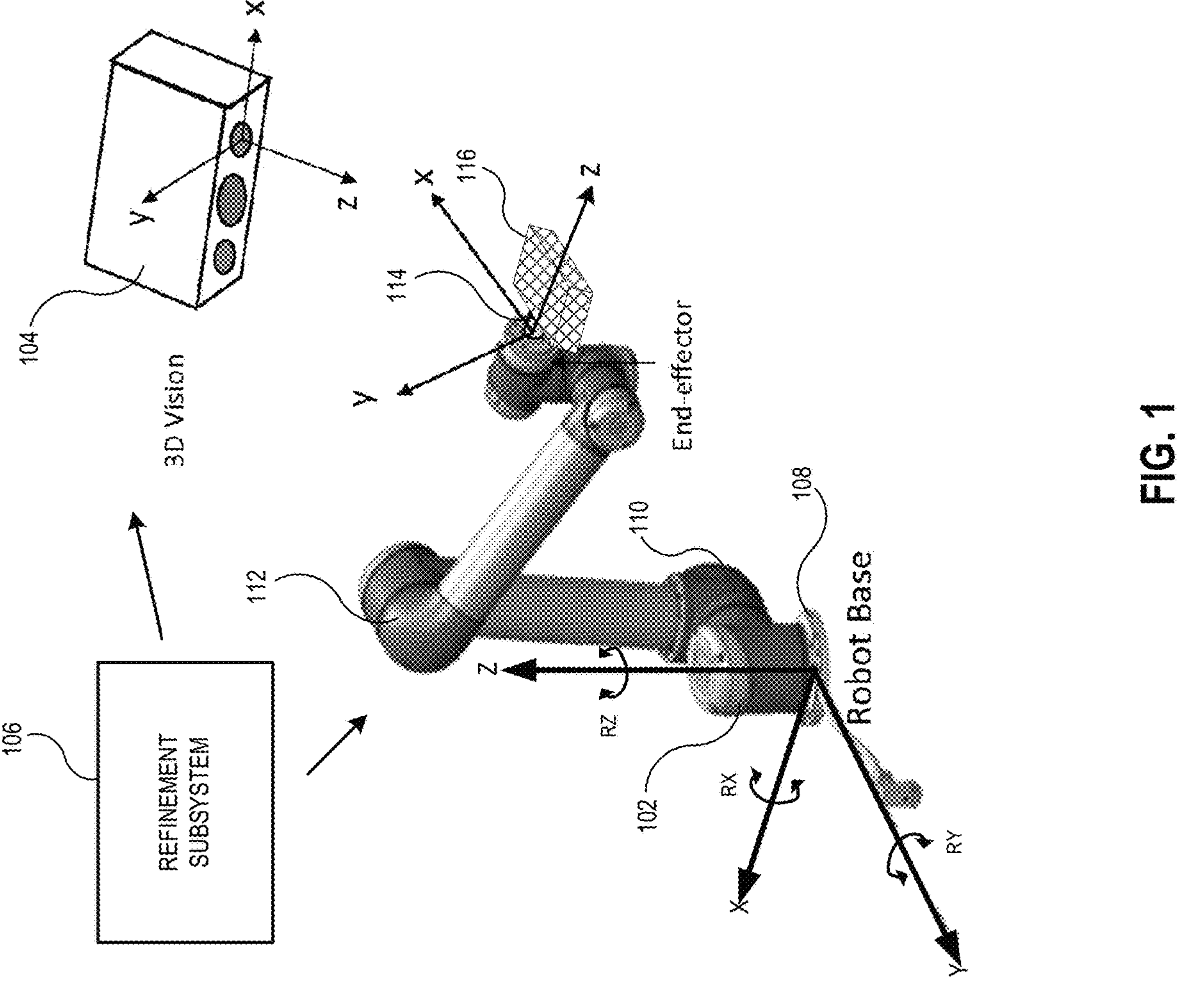
FIG. 1 illustrates an exemplary robotic system, according to one embodiment of the instant application.

Embodiments described herein solve the technical problem of improving the operation accuracy of a robotic system. More specifically, a robotic system can incorporate a refinement subsystem that can be combined with machine-learning models in controlling the operations of a robotic arm. The initial movement of the robotic arm can be guided by any known machine-learning model, and the refinement subsystem can be activated when the end-effector of the robotic arm is in the vicinity of a target component. Once activated, the refinement subsystem can determine, with refined accuracy, the poses of the target component and the end-effector. The refinement subsystem can include a 3D computer-vision system with a structured-light projector and a multi-wavelength-illumination unit to facilitate accurate segmentation of the work scene. The refinement subsystem can generate a refined motion plan based on the determined poses of the component and end-effector and control the movement of the robotic arm to perform an assembly task based on the refined motion plan. The refinement subsystem can further include an error-compensation unit that can be used to reduce pose errors of the end-effector during the movement of the robotic arm.

A Robotic System with 3D Computer Vision

An efficient robotic system can imitate a human and can include arms/hands, eyes, and a brain. Like a human arm, a robotic arm can use its hand and fingers (e.g., an end-effector) to pick up or grasp a component of interest, bring the component to a desired mounting location, and mount the component. Like a human using eyes to guide arm motion, the robotic system can use computer vision to guide the movement of the robotic arm. The movement of a human's arm is controlled by the brain, and similarly, the movement of the robotic arm is controlled by the robotic controller, which uses visual information provided by the computer vision to determine the pose(s) of the gripper in order to perform a certain task or a sequence of tasks.

As discussed previously, the robotic controller can implement various machine-learning models developed for robotic-control applications to guide the movement of the robotic arm based on images of the work scene. Those machine-learning models can be trained using real-life or synthetical data. For example, a Mask Region-based Convolutional Neural Network (Mask R-CNN) model can be trained to segment images of the work scene in order to detect the pose of a target component. In another example, the robotic controller can implement an autoregressive grasp-planning model that can map the sensor inputs (e.g., images captured by cameras) of a scene to a probability distribution over possible grasps. However, due to the uncertainty in the prediction outcome of the existing machine-learning models, the movement of the robotic arm cannot achieve the sub-millimeter accuracy required by the manufacturing of consumer electronics. In some embodiments of the instant application, the robotic system can implement a refinement subsystem that can improve the motion or component-manipulation accuracy of the robotic arm by enabling more accurate image-segmentation techniques, geometric-model-based pose-determination techniques, and machine-learning-based error-compensation techniques.

FIG. 1 illustrates an exemplary robotic system, according to one embodiment of the instant application. Robotic system 100 can include a robotic arm 102, a three-dimensional (3D) computer-vision system 104, and a refinement subsystem 106. In some embodiments, robotic arm 102 can include a base 108, multiple joints (e.g., joints 110 and 112), and a gripper 114. The combination of the multiple joints can enable robotic arm 102 to have an extensive range of movement and have six degrees of freedom (6DoF). Gripper 114 can grasp and manipulate a target component 116 (e.g., move it to a desired location, place it into a desired pose, etc.) to perform a desired task.

3D computer-vision system 104 (which may include multiple cameras) can capture images of the work scene, including gripper 114, component 116 grasped by gripper 114, and other components that may be present in the work scene. In addition to cameras, 3D computer-vision system 104 can also include various mechanisms for "understanding" the work scene based on the captured images. For example, 3D computer-vision system 104 can include mechanisms for detecting/identifying components, mechanisms for measuring the sizes of the components, mechanisms for computing the poses of the grippers, etc.

FIG. 1 shows three different Cartesian coordinate systems (e.g., X-Y-Z), including a coordinate system with its origin at the robot base (referred to as the robot-base coordinate system), a coordinate system with its origin centered at the tool/gripper (referred to as the tool-center coordinate system), and a coordinate system with its origin at the center of the cameras (referred to as the camera coordinate system). The robotic controller (not shown in FIG. 1) typically controls the motion of robotic arm 102 in reference to the robot-base coordinate system. The cameras typically observe the scene (including the observed pose of gripper 114) in reference to the camera coordinate system. The actual pose of a grasped component can be computed in the tool-center coordinate system. Various mechanisms can be used to facilitate the transformation of coordinates among the different coordinate systems. For example, calibration targets and machine-learning techniques can be used to calibrate the transformation from the camera coordinate system to the robot-case coordinate system (such transformation is referred to as eye-to-hand coordination).

Refinement subsystem 106 can include various function blocks and units that can enhance the perception of robotic system 100 of the work scene and improve the reliability and accuracy of the movement of robotic arm 102 and gripper 114.

At the initial stage of the robotic operation, the robotic controller can control the movement of robotic arm 102 based on instructions generated by conventional machine-learning models (e.g., convolutional neural networks (CNNs)). For example, the robotic controller can implement a component-classifying network to identify various components within the work scene and a pose-classifying network to determine the pose of a component of interest based on images captured by 3D computer-vision system 104. The robotic controller can then control the movement of robotic arm 102 and gripper 114 in order to pick up the component and perform a desired task. In an ideal situation, gripper 114 can be moved to the exact location of the component of interest with its pose aligned with the component in order to pick up the component. However, due to the prediction uncertainty of the machine-learning models, gripper 114 may not arrive at the exact location or have the exact pose. In such a situation, refinement subsystem 106 needs to be activated by the robotic controller in order to improve the movement accuracy of robotic arm 102.

Refinement subsystem 106 can include an illumination unit with multiple single-color light sources and a structured-light projector. Once activated, the single-color light sources can alternately emit light of different colors such that black-and-white (BW) cameras within 3D computer-vision system 104 can capture pseudo-color images of the work scene. For example, images captured under the illumination of red light can be referred to as pseudo-red images. The structured-light projector can also project codified images (e.g., spatially varying light patterns) onto the work scene. Refinement subsystem 106 can include a high-resolution image-segmentation model (e.g., a Mask Region-based Convolutional Neural Network (Mask R-CNN)) that can segment images of the work scene based on these pseudo-color images. Compared with conventional image-segmentation techniques, image segmentation using pseudo-color images can delineate a target component more precisely even in a cluttered environment. A 3D point cloud of the target component can be generated based on both the segmented images and the structured-light patterns. According to some embodiments, the 3D point cloud can be generated based on images of the scene illuminated by light patterns encoded with gray codes, such as the maximum min-SW (MMSW) gray codes. A more detailed description of the image segmentation and 3D point cloud generation can be found in U.S. patent application Ser. No. 18/098,427, entitled "SYSTEM AND METHOD FOR IMPROVING IMAGE SEGMENTATION," by inventors Zheng Xu, John W. Wallerius, and Sabarish Kuduwa Sivanath, filed 18 Jan. 2023, the disclosure of which is incorporated herein by reference.

Refinement subsystem 106 can also include a model library that stores geometric models (e.g., Computer-Aided Design (CAD) models) of various components. The pose of a component of interest can be determined based on a corresponding CAD model. In some embodiments, a template-matching technique can be used to match the CAD model to the 3D point cloud. For example, the 3D CAD model of the component can be manipulated (e.g., rotated) until the surface points of the CAD model match the surface points of the component's 3D point cloud. In a further example, a least-square matching (LSM) technique can be used to match the model pose to the component pose. The pose of gripper 114 can be similarly determined.

Once the pose of the component and the pose of gripper 114 are both determined, refinement subsystem 106 can generate a motion plan based on the determined poses and the environment. For example, the generated motion plan may specify a path for gripper 114 to arrive at the component without colliding with other components or equipment in the work scene. The robotic controller can then generate motion commands to be sent to various motors of robotic arm 102 to control the movement of gripper 114. When generating the motion commands, refinement subsystem 106 can compensate for the error in the robotic eye-to-hand coordination (i.e., the transformation between the robot-base coordinate system and the camera coordinate system). A more detailed description of the techniques used to reduce errors in the robotic eye-to-hand coordination can be found in U.S. patent application Ser. No. 17/751,228, entitled "SYSTEM AND METHOD FOR ERROR CORRECTION AND COMPENSATION FOR 3D EYE-TO-HAND COORDINATION," by inventors Sabarish Kuduwa Sivanath and Zheng Xu, filed 23 May 2022, the disclosure of which is incorporated herein by reference.

Figure 2:
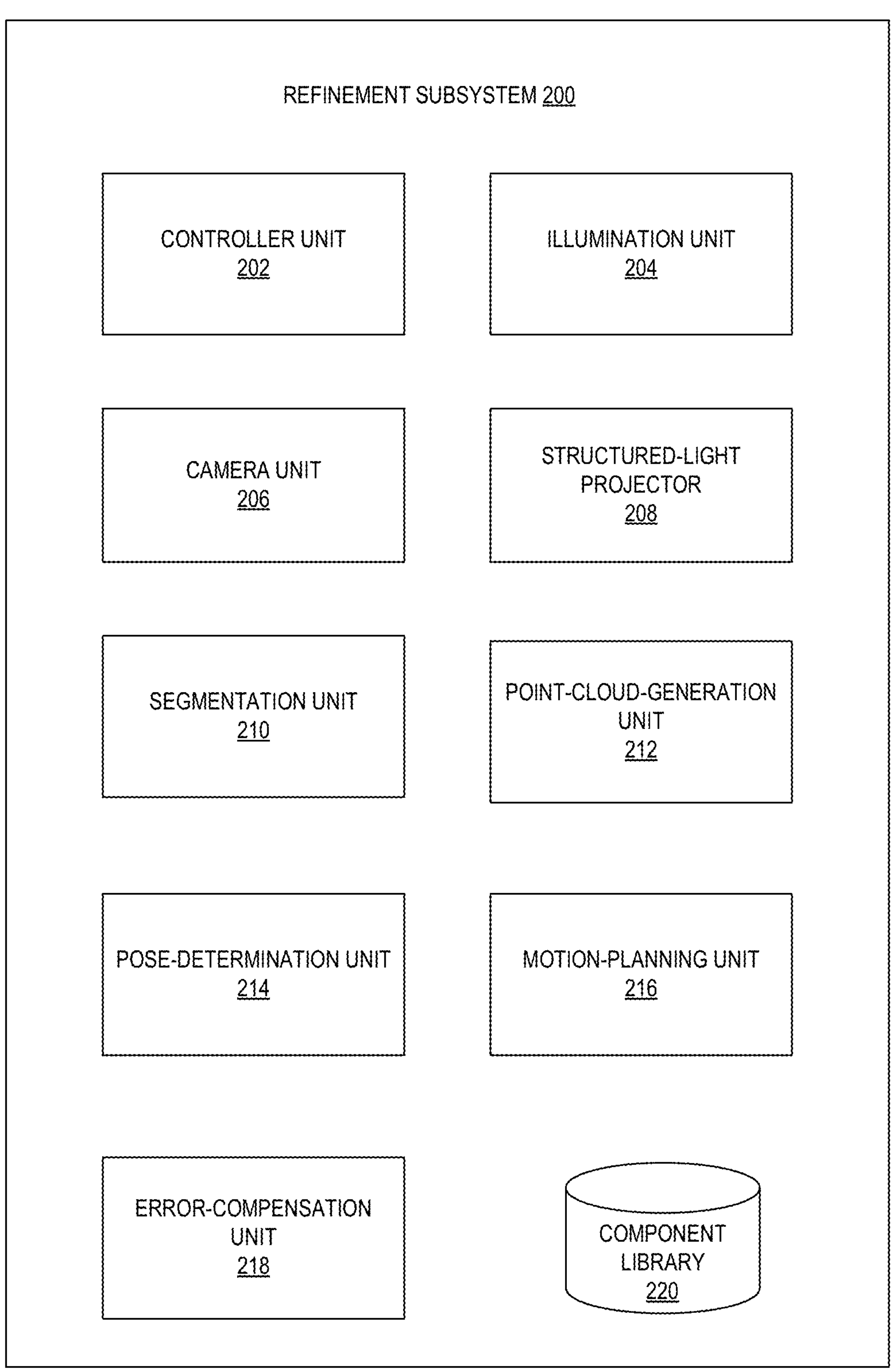
FIG. 2 illustrates a block diagram of an exemplary refinement subsystem, according to one embodiment of the instant application.

FIG. 2 illustrates a block diagram of an exemplary refinement subsystem, according to one embodiment of the instant application. Refinement subsystem 200 can facilitate the operations of a robotic system. More specifically, refinement subsystem 200 can interface with the robotic controller to improve the accuracy and reliability of the robotic operations. Refinement subsystem 200 can include a control unit 202, an illumination unit 204, a camera unit 206, a structured-light projector 208, a segmentation unit 210, a point-cloud-generation unit 212, a pose-determination unit 214, a motion-planning unit 216, an error-compensation unit 218, and a component library 220.

Control unit 202 can be responsible for controlling and coordinating the operations of various units within refinement subsystem 200, such as illumination unit 204, camera unit 206, structured-light projector 208, etc. More specifically, control unit 202 can synchronize the illumination of the work scene by illumination unit 204 and/or structured-light projector 208 with the image-capturing operation of camera unit 206.

Illumination unit 204 can include a plurality of single-color light sources. In some embodiments, single-color light sources can include light-emitting diodes (LEDs) of various colors, with the LEDs' wavelengths ranging from the ultraviolet band (e.g., around 380 nm) to the infrared band (e.g., around 850 nm). In one example, the single-color light sources can include infrared LEDs, yellow LEDs, green LEDs, and violet LEDs. The LEDs can be mounted above the work scene, with LEDs of the same color arranged in a symmetrical manner to reduce shadows. When refinement subsystem 200 is activated, or more particularly, when illumination unit 202 is turned on, the single-color light sources of different colors can be turned on alternately, one color at a time, such that the work scene is illuminated by light of a particular color at a given moment. In an alternative embodiment, LEDs of more than one color (e.g., two or three colors) can be turned on at the same time to achieve a certain desired illumination effect. The on and off of the LEDs can be controlled by control unit 202.

Camera unit 206 can include a plurality of cameras mounted above the work scene. The cameras can be arranged such that they can capture images of the work scene from different angles. The cameras can be BW cameras to achieve high resolution. In some embodiments, the BW cameras can capture pseudo-color images of the work scene. A pseud-color image refers to an image captured under the illumination of light of a particular color. The operations of the cameras within camera unit 206 can be synchronized with the LEDs in illumination unit 204 by control unit 202.

Structured-light projector 208 can be responsible for projecting codified light patterns onto the work scene. In some embodiments, the light source of structured-light projector 208 can include a laser source with an emission wavelength of approximately 455 nm. In alternative embodiments, the light source of structured-light projector 208 can include an LED. Structured-light projector 208 can project a sequence of codified light patterns onto the work scene. The projection of the light patterns can be synchronized with the image-capturing operations of camera unit 206 by control unit 202 such that at least one image can be captured for each structured-light pattern. In one embodiment, structured-light projector 208 can project light patterns encoded using binary codes (e.g., the maximum min-SW gray codes).

Segmentation unit 210 can be responsible for segmenting images of the work scene. In some embodiments, segmentation unit 210 can implement a machine-learning model, such as a Mask R-CNN, that can receive as input pseudo-color images of different colors and output an image-segmentation result. The machine-learning model can have multiple input channels (one channel per color), and pseudo-color images of different colors can be concatenated along the channel dimension (e.g., in increasing wavelength order) before being sent to the multiple input channels, with each pseudo-color image sent to a corresponding input channel. The output of the machine-learning model can include a segmentation mask. Segmentation unit 210 can further use the depth information of the scene to enhance the accuracy of the image segmentation. In one embodiment, the depth map of the scene can also be used as an input to the machine-learning model. In an alternative embodiment, the segmentation mask can be overlaid onto the images of the scene captured under the structured light (i.e., images of the structured light patterns) to generate segmentations of the structured light patterns.

Point-cloud-generation unit 212 can be responsible for generating a 3D point cloud of a component of interest. In one embodiment, point-cloud-generation unit 212 can generate the 3D point cloud of a component by overlaying a segmentation mask of the component onto the structured light patterns to delineate the component from its surroundings. In a further embodiment, point-cloud-generation unit 212 can generate the 3D point cloud of the component by overlaying a segmentation mask of the component onto images of the scene illuminated by patterns encoded using the MMSW gray codes.

Pose-determination unit 214 can be responsible for determining the pose (e.g., position and orientation) of a component based on the 3D point cloud of the component. In some embodiments, pose-determination unit 214 can determine the pose of a component based on the 3D point cloud and a geometric model (the CAD model) of the component. For example, pose-determination unit 214 can apply a template-matching technique to match the pose of the CAD model to the observed pose of the component (i.e., the pose of the 3D cloud). More specifically, pose-determination unit 214 can manipulate the pose of the CAD model until it matches the observed pose of the component. In one embodiment, pose-determination unit 214 can apply a least-square matching technique to match the poses. In addition to the component of interest, pose-determination unit 214 can also determine the pose of the gripper. In one embodiment, the pose of the gripper can be determined from the segmented images of the work scene (e.g., by segmenting out the gripper from the background). In an alternative embodiment, the pose of the gripper can be determined based on the instant settings of the various motors within the robotic arm (i.e., the robotic controller is always aware of the pose of the end-effector).

Motion-planning unit 216 can be responsible for generating a motion plan based on the poses of the gripper and the component. Note that the pose of a component includes not only the location information but also the orientation information about the component. Similarly, the pose of the gripper includes not only the location information but also the orientation information about the gripper. When generating the motion plan, motion-planning unit 216 needs to take into consideration environmental factors, such as other components or equipment that may be on the path of the gripper. Motion-planning unit 216 can compute a path for the gripper such that the gripper can arrive at the component of interest without interference from other components or equipment in the work scene. In some embodiments, motion-planning unit 216 can compute the path based on 3D images of the work scene. In further embodiments, motion-planning unit 216 can use a machine-learning technique to compute the path. For example, a trained deep-learning neural network can be used to plan a path between two locations within the work scene.

Error-compensation unit 218 can be responsible for compensating for, in real-time, errors in the movement of the gripper while it is moving according to the motion plan. More specifically, due to errors in the transformation between the camera coordinate system (which can be used to represent the observed poses of the component and gripper) and the robot-base coordinate system (which can be used by the robotic controller to generate motion commands/instructions to be sent to various motors in the robotic arm) and mechanical imperfections of the motors, the movement of the robotic arm planned by the controller may be different from the actual movement observed by the cameras. In other words, pose errors may exist between the controller-desired pose and the camera-instructed pose. To compensate for such errors, the pose of a component of interest can first be determined, by cameras, in the camera coordinate system, and then the pose can be converted (e.g., based on a predetermined transformation matrix) to coordinates in the robot-base coordinate system, referred to as the camera-instructed pose. In some embodiments, error-compensation unit 218 can apply a machine-learning technique to infer an error matrix for the camera-instructed pose and then compute a controller-desired pose of the gripper based on the camera-instructed pose and the error matrix.

Applying the machine-learning technique can include training a deep-learning neural network using a number of test samples. The trained neural network can take as input a camera-instructed pose and output an error matrix. The error matrix can correlate the camera-instructed pose to the controller-desired pose. In one embodiment, the controller-desired pose can be obtained by multiplying the camera-instructed pose with the error matrix. The controller-desired pose of the gripper can then be sent to the robotic controller to generate motion commands, which will cause the gripper to achieve the camera-instructed pose in order to successfully grasp the component. In one example, the motion plan may include multiple steps, and error-compensation unit 218 can compensate for the pose error at each step.

Component library 220 can include geometric models (e.g., CAD models) of various components in the work scene.

Figure 3:
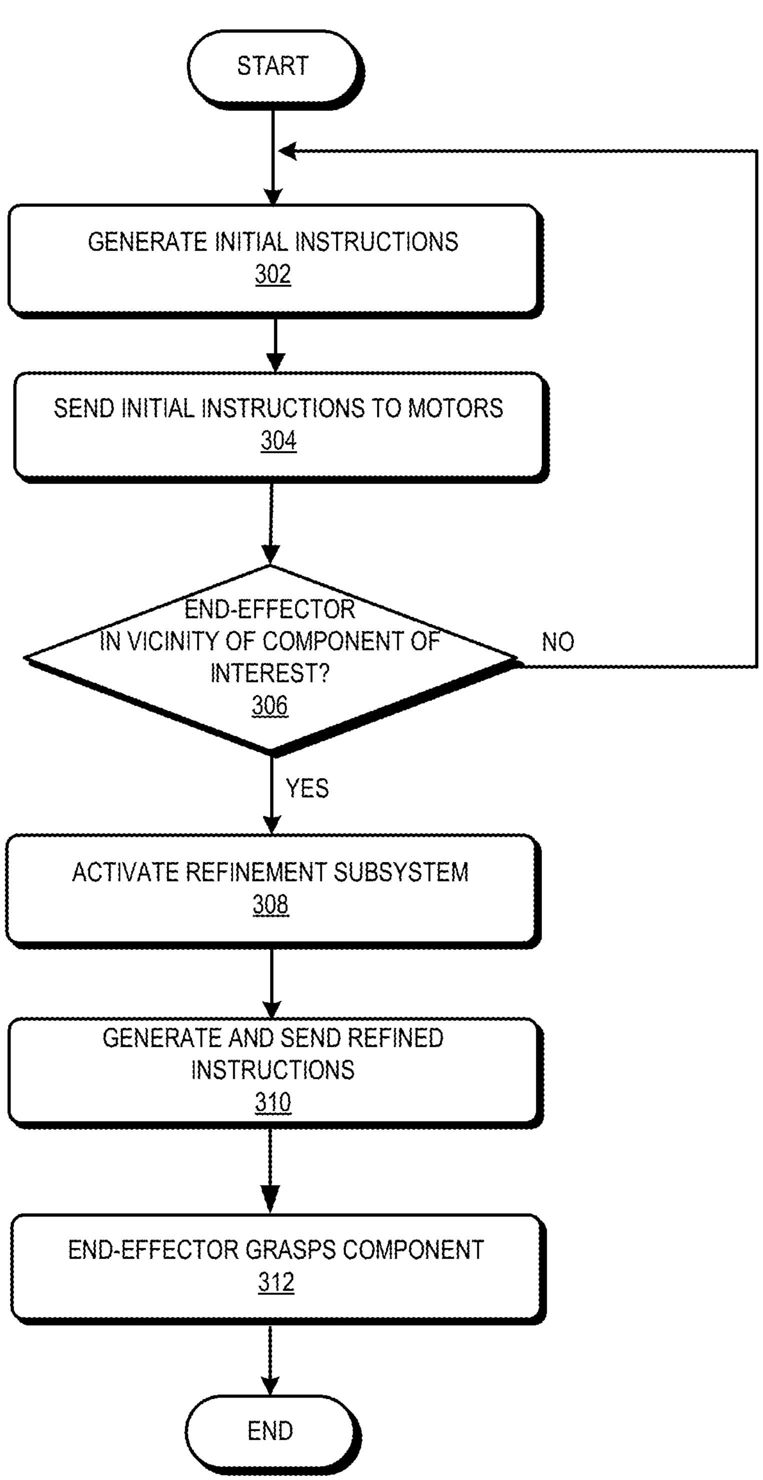
FIG. 3 presents a flowchart illustrating an exemplary operation process of a robotic system, according to one embodiment of the instant application.

FIG. 3 presents a flowchart illustrating an exemplary operation process of a robotic system, according to one embodiment of the instant application. During operation, the robotic controller can generate a set of initial instructions or motion commands based on images of the work scene (operation 302). In some embodiments, the robotic controller may implement one or more conventional machine-learning models (e.g., CNNs) to locate a component of interest and estimate its pose based on 2D and/or 3D images of the work scene. The estimated pose may include errors, and the set of initial instructions can be generated based on the estimated pose. The robotic controller can send the initial instructions or motion commands to various motors of the robotic arm to control the movement of the end-effector (operation 304). The end-effector can be instructed to move toward the component of interest.

Once the end-effector stops its movement, the robotic controller can determine, based on current images of the work scene, whether the end-effector is in the vicinity of the component of interest (operation 306). For example, based on images of the scene captured by a high-resolution camera with a small field of view (FOV), the robotic controller can determine whether the end-effector is in the FOV of the camera. If the end-effector is not in the vicinity of the component of interest, the robotic controller can re-generate the initial instructions or motion commands based on current images of the work scene (operation 302).

If the end-effector is in the vicinity of the component of interest, the robotic controller can activate the refinement subsystem (operation 308). The refinement subsystem can be similar to the one shown in FIG. 2. Once activated, the various units in the refinement subsystem (e.g., the control unit, illuminate unit, camera unit, structured light projector, segmentation unit, point-cloud-generation unit, pose-determination unit, motion-planning unit, and error-compensation unit) can interact with each other to provide more accurate information about the pose of the component of interest. In one example, once activated, the refinement subsystem can configure the single-color light sources of different colors to alternately illuminate the work scene, one color at a time, and configure one or more cameras to capture pseudo-color images of the work scene. The refinement subsystem can also configure the structured-light projector to project codified light patterns onto the work scene and configure the cameras to capture images of the work scene with the projected codified light patterns. The refinement subsystem can further determine the refined pose of the component of interest based on the pseudo-color images of the work scene and the images of the work scene with the projected codified light patterns. In some embodiments, the refinement subsystem can generate a 3D point cloud of the component by generating a segmentation mask based on the pseudo-color images and overlaying the segmentation mask on images of the work scene with the projected codified light patterns. A refined pose of the component of interest can then be determined based on template matching between the 3D point cloud and a 3D geometric model of the component.

The robotic controller can subsequently generate and send a set of refined instructions or motion commands to the motors based on the refined pose of the component (operation 310). Note that generating the refined instructions can include compensating for possible errors in the transformation between the camera coordinate system and the robot-base coordinate system. Upon receiving the refined instructions, the motors in the robotic arm can operate accordingly, causing the end-effector to grasp the component of interest (operation 312).

The process shown in FIG. 3 is an example of how the robotic arm can perform a simple operation of grasping a component of interest with the assistance of the refinement subsystem. In practice, the robotic arm can perform more sophisticated assembly operations, such as attaching a radio frequency (RF) pad or an RF cable head to a corresponding socket. The refinement subsystem also needs to be activated to ensure that such a task can be successfully performed (e.g., the end-effector can identify the pad or cable head from various components scattered around the work scene, grasp the pad or cable head, move the pad or cable head to the vicinity of the corresponding socket, and successfully attach the pad or cable head to the socket).

Figure 4:
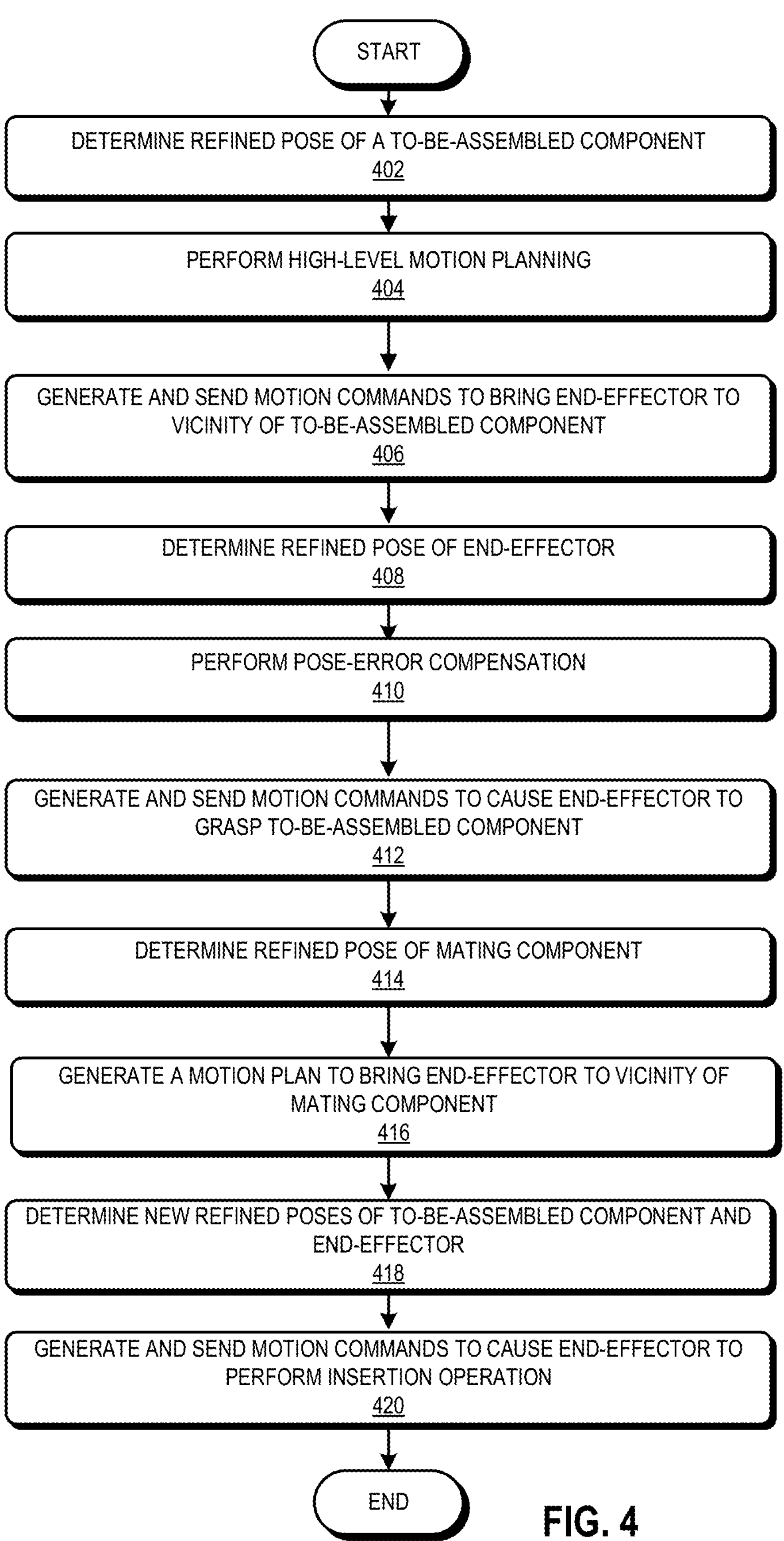
FIG. 4 presents a flowchart illustrating an exemplary process for performing an assembly task, according to one embodiment of the instant application.

FIG. 4 presents a flowchart illustrating an exemplary process for performing an assembly task, according to one embodiment of the instant application. The assembly task can include an insertion operation, such as inserting an RF pad or cable head into a corresponding socket. During operation, the robotic system can determine, based on the output of the refinement subsystem, the refined pose of a to-be-assembled component (operation 402). The to-be-assembled component can include an RF pad or cable head. More specifically, determining the refined pose of the component can include performing image segmentation based on pseudo-color images of the work scene captured by cameras under the illumination of single-color light sources of different colors. Determining the refined pose of the component can further include overlaying the segmentation mask on top of images with projected structured light patterns in order to separate the 3D images of the component from the background. A 3D point cloud corresponding to the component can be generated based on the segmented 3D images, and the refined pose of the component can be determined by template matching between the 3D point cloud and a 3D geometric model of the component.

Subsequently, the robotic system can perform high-level motion planning (operation 404). For example, the robotic system can compute a path for bringing the end-effector to the vicinity of the component. In some embodiments, a conventional machine-learning-based motion-planning technique can be used, without activating the refinement subsystem, to compute the path to ensure that the end-effector can be brought near the component without interference from other components or equipment in the work scene. The robotic controller can then generate and send motion commands to motors to bring the end-effector to the vicinity of the component (operation 406). In some embodiments, multiple iterations may be needed to ensure that the end-effector and component are both in the FOV of the high-resolution cameras of the refinement subsystem.

The robotic system can then determine the refined pose of the end-effector (operation 408). Note that the robotic system can use a similar segmentation technique to segment the 3D images of the end-effector from the background. The refined pose of the end-effector can also be determined by template matching between the 3D point cloud of the end-effector and its geometric model. In some embodiments, an end-effector may include one or more tags that can be identified as features for template matching. The location of each tag can be used as a starting point for the model-based point cloud registration.

With the refined poses of the end-effector and component determined, the robotic system can perform pose-error compensation until the pose error is below a predetermined threshold (operation 410). In some embodiments, performing the pose-error compensation can include inferring an error matrix that can be used to transform a camera-instructed pose as viewed by the cameras to a controller-desired pose such that, when the robotic controller controls the movement of the robotic arm based on the controller-desired pose, the end-effector achieves, as observed by the cameras, the camera-instructed pose.

The robotic controller can then generate and send motion commands that cause the end-effector to successfully grasp the to-be-assembled component (operation 412). For example, the robotic controller can generate the motion commands based on the controller-desired pose.

The robotic system can determine the refined pose of the mating component (operation 414). For an insertion operation, the mating component can be a corresponding socket accepting the RF pad or cable head. The refined pose of the mating component can be determined using a similar technique as discussed previously.

Based on the refined pose of the mating component, the robotic system can generate a motion plan to bring the end-effector to the vicinity of the mating component (operation 416). The robotic system can subsequently determine the new refined pose of the to-be-assembled component (as its pose changes after being grasped by the end-effector) and the new refined pose of the end-effector (operation 418) and then generate and send motion commands that cause the end-effector to successfully perform the insertion operation (operation 420). Generating the motion commands may include the robotic system determining a transformation matrix (e.g., a component-transformation matrix) that can correlate the pose of the end-effector with the pose of the grasped component. Note that generating the motion commands can also include operations for compensating for pose errors. Detailed descriptions of the component-transformation matrix and the pose-error compensations can be found in the aforementioned U.S. patent application Ser. No. 17/751,228.

Figure 5:
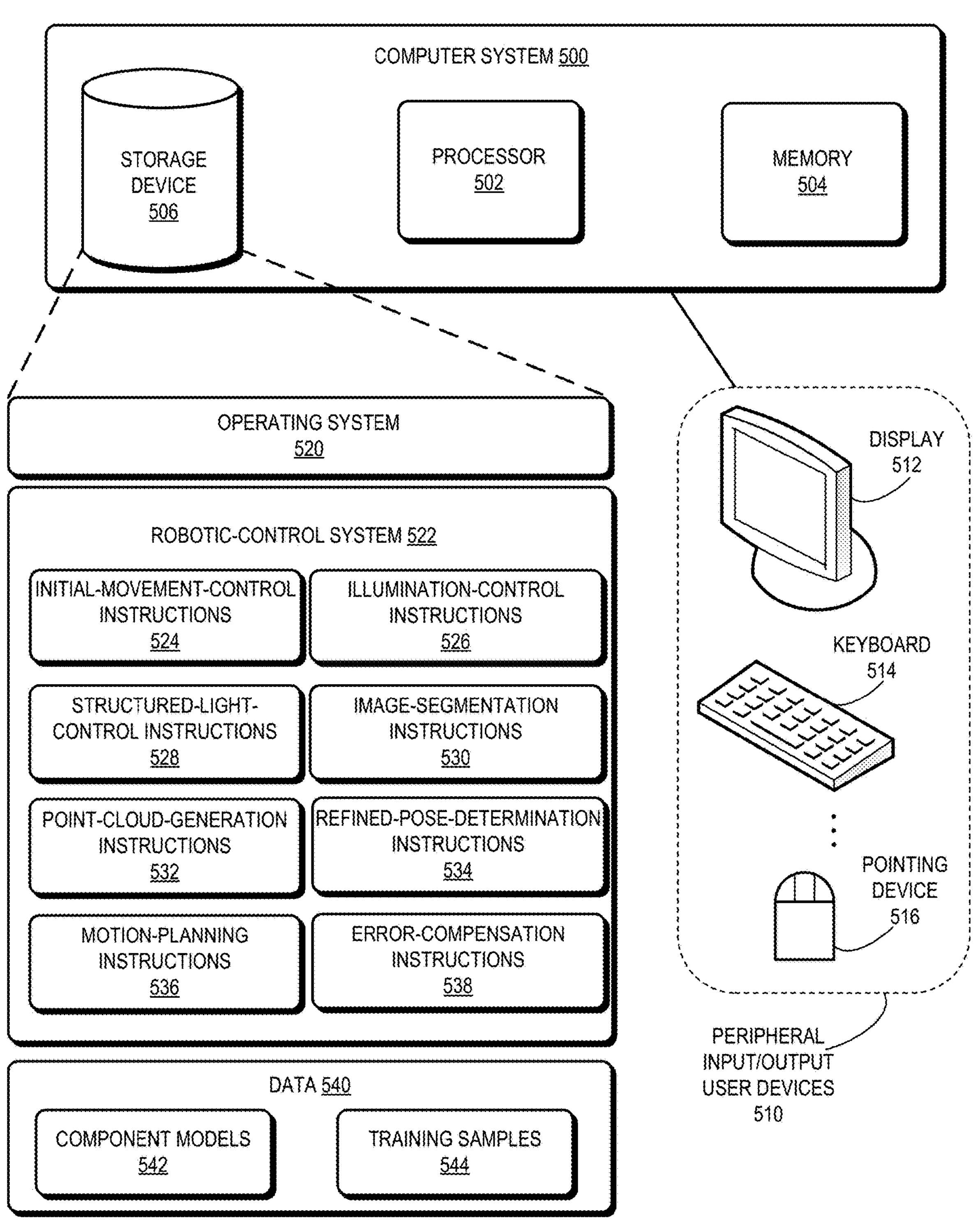
FIG. 5 illustrates an exemplary computer system that facilitates the operation of the robotic system, according to one embodiment of the instant application.

FIG. 5 illustrates an exemplary computer system that facilitates the operation of the robotic system, according to one embodiment. Computer system 500 includes a processor 502, a memory 504, and a storage device 506. Furthermore, computer system 500 can be coupled to peripheral input/output (I/O) user devices 510, e.g., a display device 512, a keyboard 514, and a pointing device 516. Storage device 506 can store an operating system 520, a robotic-control system 522, and data 540.

Robotic-control system 522 can include instructions, which when executed by computer system 500, can cause computer system 500 or processor 502 to perform methods and/or processes described in this disclosure. Specifically, robotic-control system 522 can include instructions for controlling the initial movement of the end-effector to bring the end-effector to the vicinity of the site of the operation (initial-movement-control instructions 524), instructions for controlling the illumination unit to synchronize operations of the illumination unit and the cameras (illumination-control instructions 526), instructions for controlling the structured-light projector to synchronize operations of the structured-light projector and the cameras (structured-light-control instructions 528), instructions for performing image segmentations based on pseudo-color images (image-segmentation instructions 530), instructions for generating 3D point clouds of components of interest (point-cloud-generation instructions 532), instructions for determining the refined poses of components and end-effector (refined-pose-determination instructions 534), instructions for performing high-level motion planning (motion-planning instructions 536), and instructions for compensating for pose errors during movement of the end-effector (error-compensation instructions 538). Data 540 can include component models 542 and training samples 544 used by various machine-learning models.

In general, embodiments of the present invention can provide a system and method for refined control of the movement of the end-effector of a robotic arm. The robotic system can include a refinement subsystem that can improve the accuracy and reliability of the robotic operation. Compared with a conventional robotic control system that relies on existing machine-learning techniques, the refinement subsystem can implement more advanced image-segmentation and point-cloud-generation techniques to determine the refined poses of components and end-effector in the work scene. The advanced image segmentation can be performed based on pseudo-color images, and the refined poses can be determined based on 3D point clouds and geometric models of the components and end-effector. In addition, a machine-learning-based error-compensation technique can be used to compensate for the pose errors resulting from the transformation between the camera-coordinate system and the robot-base coordinate system.

The foregoing description is presented to enable any person skilled in the art to make and use the embodiments and is provided in the context of a particular application and its requirements. Various modifications to the disclosed embodiments will be readily apparent to those skilled in the art, and the general principles defined herein may be applied to other embodiments and applications without departing from the spirit and scope of the present disclosure. Thus, the present invention is not limited to the embodiments shown but is to be accorded the widest scope consistent with the principles and features disclosed herein.

The methods and processes described in the detailed description section can be embodied as code and/or data, which can be stored in a computer-readable storage medium as described above. When a computer system reads and executes the code and/or data stored on the computer-readable storage medium, the computer system performs the methods and processes embodied as data structures and code and stored within the computer-readable storage medium.

Furthermore, the methods and processes described above can be included in hardware devices or apparatus. The hardware modules or apparatus can include, but are not limited to, application-specific integrated circuit (ASIC) chips, field-programmable gate arrays (FPGAs), dedicated or shared processors that execute a particular software unit or a piece of code at a particular time, and other programmable-logic devices now known or later developed. When the hardware devices or apparatus are activated, they perform the methods and processes included within them.

What is claimed is:

1. A robotic system comprising:

a robotic arm comprising an end-effector;

an illumination unit comprising a plurality of single-color light sources of different colors;

a structured-light projector;

one or more black-and-white cameras; and a computer system comprising a processor and a storage device storing instructions that when executed by the processor cause the processor to perform a method, the method comprising:

estimating an initial pose of a component of interest;

controlling the robotic arm to move the end-effector based on the estimated initial pose of the component without activating the illumination unit, the structured light projector, and the back-and-white cameras;

in response to determining that the end-effector is in vicinity of the component, activating the illumination unit, the structured light projector, and the black-and-white cameras, such that the black-and-white cameras capture pseudo-color images of the scene under the illumination of the illumination unit and images of the scene with the codified light patterns projected by the structured light projector, wherein a respective pseudo-color image is captured when the scene is illuminated by a single-color light source of a corresponding color;

concatenating multiple pseudo-color images of different colors in increasing wavelength order;

inputting the concatenated multiple pseudo-color images of different colors into a neural network with multiple input channels, wherein each pseudo-color image is sent to a corresponding input channel;

determining a refined pose of the component of interest based on an output of the neural network;

generating a motion plan for the end-effector based on the determined refined pose of the component and a current pose of the end-effector; and controlling movement of the end-effector according to the motion plan to allow the end-effector to grasp the component of interest.

2. The robotic system of claim 1, wherein the method further comprises compensating for errors in the movement of the end-effector.

3. The robotic system of claim 2, wherein compensating for errors in the movement of the end-effector comprises applying a machine-learning technique to determine a controller-desired pose corresponding to a camera-instructed pose of the end-effector such that, when the robotic controller controls the movement of the end-effector based on the controller-desired pose, the end-effector achieves, as observed by the cameras, the camera-instructed pose.

4. The robotic system of claim 1, wherein the single-color light sources comprise light-emitting diodes (LEDs), and wherein colors of the single-color light sources range between ultraviolet and infrared.

5. The robotic system of claim 1, wherein determining the pose further comprises generating a segmentation mask for an image of the scene based on the output of the neural network.

6. The robotic system of claim 5, wherein the method further comprises generating a three-dimensional (3D) point cloud of the component of interest by overlaying the segmentation mask on the images of the scene with the projected codified light patterns.

7. The robotic system of claim 6, wherein the pose of the component of interest is determined based on the 3D point cloud and a geometric model of the component.

8. The robotic system of claim 5, wherein the neural network comprises a Mask Region-based Convolutional Neural Network (Mask R-CNN).

9. The robotic system of claim 1, wherein the codified light patterns are encoded based on maximum min-SW gray codes.

10. A computer-implemented method for controlling a robotic arm, the method comprising:

generating, by a robotic controller, an initial set of instructions to control the robotic arm to move an end-effector towards a component of interest in a work scene without activating a refinement subsystem comprising an illumination unit with a plurality of single-color light sources of different colors, a structured light projector, and one or more back-and-white cameras;

in response to determining that the end-effector is within a vicinity of the component of interest, activating the refinement subsystem by:

alternately turning on the plurality of single-color light sources of different colors to illuminate the work scene;

activating the structured-light projector to project codified light patterns onto the work scene; and activating the one or more black-and-white cameras to capture pseudo-color images of the work scene and images of the work scene with the codified light patterns projected by the structured-light projector, wherein a respective pseudo-color image is captured when the scene is illuminated by a single-color light source of a corresponding color;

concatenating multiple pseudo-color images of different colors in increasing wavelength order;

inputting the concatenated multiple pseudo-color images of different colors into a neural network with multiple input channels, wherein each pseudo-color image is sent to a corresponding input channel;

determining a refined pose of the component of interest based on an output of the neural network;

generating a set of refined instructions based on the determined refined pose of the component and a current pose of the end-effector; and controlling, by the robotic controller, movement of the end-effector according to the set of refined instructions to allow the end-effector to grasp the component of interest.

11. The method of claim 10, further comprising compensating for errors in the movement of the end-effector.

12. The method of claim 11, wherein compensating for errors in the movement of the end-effector comprises applying a machine-learning technique to determine a controller-desired pose corresponding to a camera-instructed pose of the end-effector such that, when the robotic controller controls the movement of the end-effector based on the controller-desired pose, the end-effector achieves, as observed by the cameras, the camera-instructed pose.

13. The method of claim 10, wherein the single-color light sources comprise light-emitting diodes (LEDs), and wherein colors of the single-color light sources range between ultraviolet and infrared.

14. The method of claim 10, wherein determining the pose further comprises generating a segmentation mask for an image of the work scene based on the output of the neural network.

15. The method of claim 14, further comprising generating a three-dimensional (3D) point cloud of the component of interest by overlaying the segmentation mask on the images of the scene with the projected codified light patterns.

16. The method of claim 15, wherein the pose of the component of interest is determined based on the 3D point cloud and a geometric model of the component.

17. The method of claim 14, wherein the neural network comprises a Mask Region-based Convolutional Neural Network (Mask R-CNN).

18. The method of claim 10, wherein the codified light patterns are encoded based on maximum min-SW gray codes.

* * * * *